US006375812B1

(12) United States Patent
Leonida

(10) Patent No.: US 6,375,812 B1
(45) Date of Patent: Apr. 23, 2002

(54) WATER ELECTROLYSIS SYSTEM

(75) Inventor: Andrei Leonida, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/524,250

(22) Filed: Mar. 13, 2000

(51) Int. Cl.[7] .............................. C25B 9/00; C25C 7/00; C25D 17/00

(52) U.S. Cl. ..................... 204/269; 204/270; 204/275.1

(58) Field of Search ................................ 204/267, 269, 204/270, 275.1; 205/628, 633, 637; 55/421

(56) References Cited

U.S. PATENT DOCUMENTS

| | | | |
|---|---|---|---|
| 3,766,044 A | * 10/1973 | Westerlund | 204/236 |
| 3,888,750 A | 6/1975 | Brecher et al. | |
| 4,059,495 A | 11/1977 | de Nora et al. | |
| 4,177,118 A | 12/1979 | Campbell | |
| 4,240,887 A | 12/1980 | Hall | |
| 4,388,162 A | 6/1983 | Sammells et al. | |
| 4,470,893 A | 9/1984 | Oda et al. | |
| 4,505,789 A | * 3/1985 | Ford | 95/261 |
| 5,110,436 A | 5/1992 | Schubert et al. | |
| 5,112,463 A | 5/1992 | Zhang et al. | |
| 5,496,659 A | 3/1996 | Zito | |
| 5,512,145 A | 4/1996 | Hollenberg | |
| 5,589,052 A | 12/1996 | Shimamune et al. | |
| 5,690,797 A | 11/1997 | Harada et al. | |
| 5,843,292 A | 12/1998 | Spiros | |
| 5,843,297 A | 12/1998 | Schmid et al. | |
| 5,879,522 A | 3/1999 | Shaaban et al. | |
| 6,080,290 A | * 6/2000 | Stuart et al. | 204/269 |

* cited by examiner

*Primary Examiner*—Kathryn Gorgos
*Assistant Examiner*—Wesley A. Nicolas

(57) ABSTRACT

A water electrolysis system includes a water electrolysis cell stack having an anode and a cathode. A water storage tank having an outlet is disposed above the cell stack and communicates with an inlet of one of the anode and the cathode of the cell stack for gravity feeding water from the water storage tank to the cell stack. A phase separator is disposed below and in communication with the water storage tank. The phase separator has an inlet for receiving a two phase stream including water and product gas exiting an outlet of the one of the anode and cathode of the cell stack, and includes a conduit having a lower end disposed within the phase separator for receiving water recovered in the phase separator. The conduit has an upper end extending into the water storage tank. Further, the conduit defines a plurality of openings along a portion of the conduit disposed in the phase separator such that the product gas received in the inlet of the phase separator enters the inside of the conduit through the openings and entrains and lifts water upwardly therewith through the conduit and into the water storage tank whereby water is recirculated through the cell stack.

12 Claims, 2 Drawing Sheets

WATER ELECTROLYSIS SYSTEM

FIELD OF THE INVENTION

The present invention relates generally to a method and system of water electrolysis, and more particularly to a method and system of water electrolysis employing external gas-lift for water circulation.

BACKGROUND OF THE INVENTION

Water electrolysis systems quite frequently employ some mechanical means for circulating water. The process has the advantage of controlling the temperature while at the same time ensuring an adequate supply of reactant—i.e., water—to the electrodes. Forced circulation is acceptable for most applications. For the applications that could benefit in some way from a reduction in the number of system parts, other designs have been implemented. For example, static water feed electrolysis cells use a semi-permeable membrane next to the electrode to separate bulk water from the amount needed for the process. Each cell contains the semipermeable membrane and additional manifolds to handle, what amounts to, an additional fluid stream. The cell design is therefore more complex. Temperature control is achieved by some other means. Cells of this design have been tested successfully, but have the disadvantage of higher power consumption for the same gas output, i.e., current density.

There is a need for a water electrolysis method and system that preserves the cell performance over a wide range of current densities without the added complexity of a mechanical device for water circulation so as to extend the field of potential applications.

Other objects and advantages of this invention will become more readily apparent when the following description is read in conjunction with the accompanying drawings.

SUMMARY OF THE INVENTION

In one aspect of the present invention, a water electrolysis system includes a water electrolysis cell stack having an anode and a cathode. A water storage tank having an outlet is disposed above the cell stack and communicates with an inlet of one of the anode and the cathode of the cell stack for gravity feeding water from the water storage tank to the cell stack. A phase separator is disposed below and in communication with the water storage tank. The phase separator has an inlet for receiving a two phase stream including water and product gas exiting an outlet of the one of the anode and cathode of the cell stack, and includes a conduit having a lower end disposed within the phase separator for receiving water recovered in the phase separator. The conduit has an upper end extending into the water storage tank. Further, the conduit defines a plurality of openings along a portion of the conduit disposed in the phase separator such that the product gas received in the inlet of the phase separator enters the inside of the conduit through the openings and entrains and lifts water upwardly therewith through the conduit and into the water storage tank, whereby water may be recirculated through the stack. This lifting of water entrained on gas bubbles is known as the gas lift principle. Preferably the system operates in an anode feed mode whereby water is circulated by means of the gas lift principle through the anode side of the cell stack, and the product gas providing gas lift is oxygen.

In another aspect of the present invention, a method of circulating water through a water electrolysis cell stack having an anode and a cathode includes gravity feeding water from a water storage tank to an inlet of one of the anode and cathode of the cell stack. A two phase stream including water and product gas is separated upon the two phase stream exiting an outlet of the one of the anode and cathode of the cell stack. The separated water is directed upwardly into the water storage tank for recirculation through the cell stack by means of the gas-lift principle where bubbles of product gas in the water entrain water and move the entrained water upwardly along with the bubbles so that the recovered water may be in position to be recirculated through the cell stack.

DETAILED DESCRIPTION OF THE PREFERRED EMBODIMENTS

Figure 1:
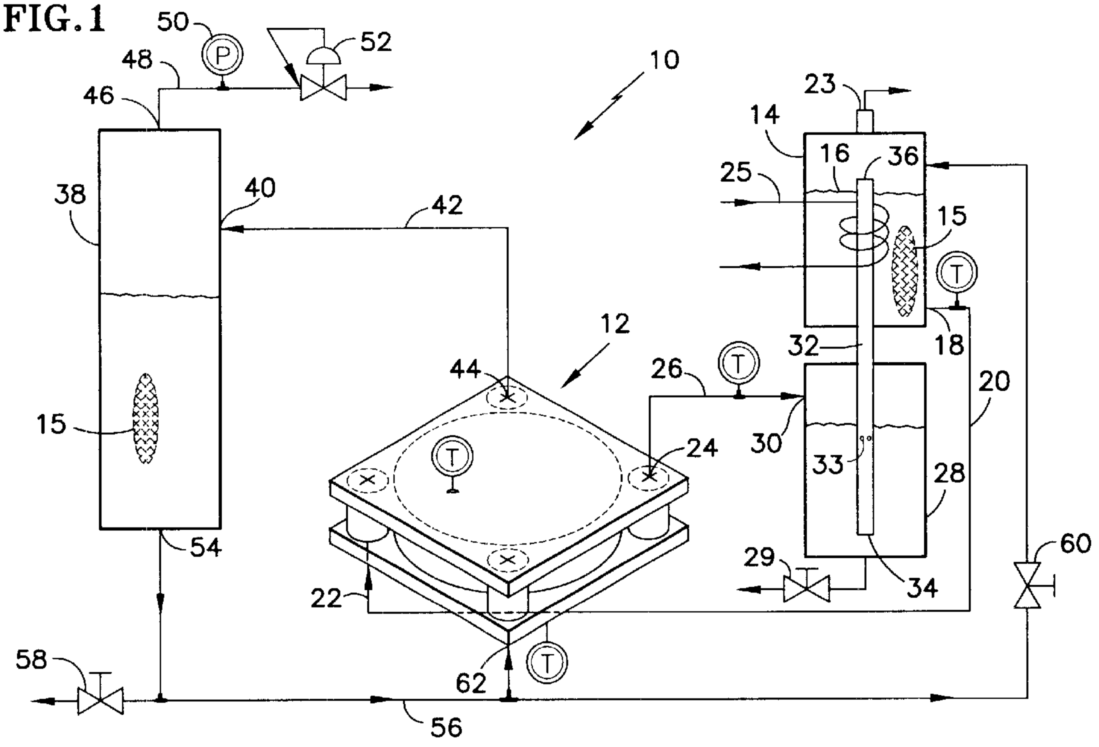
FIG. 1 is a schematic illustration of a water electrolysis system embodying the present invention.

With reference to FIG. 1, a water electrolysis system embodying the present invention is generally designated by the reference number 10. The system 10 to be described is useful for most stationary electrolysis systems providing, for example, bulk hydrogen production or the storage of solar energy. The system 10 includes a cell stack 12 including one or more cells. The cell stack 12 includes an anode and a cathode which, when an electrical potential is applied therebetween (not shown), uses water serving as a reactant to generate product gases including hydrogen and oxygen. Water electrolysis systems, such as the system 10 shown in FIG. 1, typically serve as a hydrogen generator. The hydrogen generated from water electrolysis systems are typically used as a reactant in fuel cells for the generation of electricity.

The system 10 further includes a first water storage tank 14 for holding water 16 serving as the reactant for the cell stack 12. Preferably a water purifier, such as a deionizing (DI) resin bag 15 is employed in the tank 14 for removing from the water CO2 and other impurities originating from flow within the cell stack 12. If not removed, the CO2 and other impurities will tend to lower the resistivity of the water and thereby produce parasitic current. The water storage tank 14 includes a water outlet 18 disposed adjacent to a lower end of the tank which communicates via water supply line 20 with an inlet 22 of the anode of the cell stack 12. The water storage tank 14 also includes a product gas outlet 23 located adjacent to an upper end thereof for venting or otherwise capturing product oxygen. Cooling of the cell stack 12 may be accomplished through natural convection through the ambient air surrounding the cell stack when the system 10 is operating at low power levels such as, for example, 50 W. However, additional means for cooling the water in the first water storage tank 14 may be necessary when the cell stack 12 is operating at higher power levels such as, for example, 500 W. The means for cooling may be accomplished, for example, by a coil 25 disposed in the tank 14 circulating cool water therethrough in order to cool the surrounding water in the tank. An outlet 24 of the anode of the cell stack 12 communicates via a water supply line 26 with a phase separator 28 at an inlet 30 disposed adjacent to an upper end of the phase separator. The phase separator 28 receives and separates water from product oxygen generated at the anode of the cell stack 12. For convenience, the phase separator 28 may further include a valve 29, such as a manually operated valve, located adjacent to a lower end thereof for draining water from the phase separator when the phase separator is not in use.

As shown in FIG. 1, the water storage tank 14 is disposed above the cell stack 12 in order that water held therein may be gravity fed to the inlet 22 of the anode of the cell stack. Also located below the water storage tank 14 is the phase separator 28 which fluidly communicates with the water storage tank via a conduit 32. The conduit 32 has a lower end 34 disposed within the phase separator 28 adjacent to a lower end thereof, and has an upper end 36 disposed within the water storage tank 14 adjacent to an upper end thereof.

A second phase separator 38 has an inlet 40 disposed adjacent to an upper end thereof and communicates via a supply line 42 with an outlet 44 of the cathode of the cell stack 12. The second phase separator 38 receives and separates water from product hydrogen generated at the cathode of the cell stack 12. A water purifier or DI resin bag 15 is disposed in the phase separator for removing $CO_2$ and other impurities from the water flowing through the cathode of the cell stack 12. The phase separator includes a product gas outlet 46 for directing product hydrogen away from the second phase separator via supply line 48. A pressure sensor 50 may be interposed along the line 48 and employed for regulating a back pressure device 52 when hydrogen pressure is above a predetermined threshold. The second phase separator 38 also includes a water outlet 54 located adjacent to a lower end thereof for directing via supply line 56 protonically pumped water from the second phase separator to the water storage tank 14. For convenience, a drain valve 58, such as a manually operated valve, may be interposed along the line 56 to drain excess water from the second phase separator 38 when the second phase separator is not in use. A control valve 60 may also be interposed along the line 56 to control the amount of water flow from the second phase separator 38 to the water storage tank 14. Additional standard electronic controls could be added as necessary depending on system size and the required degree of sophistication. For example, sensors to detect water level in the storage tanks, pressure controls, and sensors to shut down the system in response to high water conductivity due to impurities may be added.

As mentioned above, the coil 25 disposed in the water storage tank 14 may be necessary for providing additional cooling to the cell stack 12. For larger cell stacks, it may also be preferable that a portion of the water flowing from the second phase separator 38 to the water storage tank 14 be diverted to an inlet 62 of the cathode of the cell stack 12 to provide additional cooling to the cell stack.

The operation of the system 10 will now be explained in anode feed mode. The system 10 is described by way of example with respect to a cell stack employing an acid electrolyte. An acid electrolyte facilitates water to be protonically pumped from the anode to the cathode of the cell stack. It should be understood that a cell stack using an alkaline electrolyte may also be employed without departing from the scope of the present invention. An alkaline electrolyte facilitates water to be hydroxyl pumped from the cathode to the anode of the cell stack.

Water held in the water storage tank 14 is gravity fed from the tank's outlet 18 to the inlet 22 of the anode of the cell stack 12. When the system 10 is electrically powered (i.e., voltage potential is applied to the anode and cathode of the cell stack 12), product oxygen is generated at the anode side of the cell stack 12, and a two phase stream including unused water and the product oxygen leaves the cell stack at the outlet 24 of the anode. The two phase stream of water and oxygen enters the phase separator 28 at its inlet 30 wherein the water separates from and is disposed below the product oxygen. As oxygen builds up in pressure within the phase separator 28, it slightly compresses and bears downwardly against the water. The conduit 32 connecting the first phase separator 28 to the water storage tank 14 defines openings 33 situated along the conduit at about water level which receive oxygen. The oxygen within the conduit 32 forms bubbles in the water contained in the conduit which rise upwardly through the tube and into the water storage tank 14. The oxygen bubbles entrain water and thereby carry water upwardly along the conduit and into the water storage tank 14 whereby the water may be recirculated through the cell stack 12. In the water storage tank 14 the water is again separated from and disposed below the oxygen. Because water is used to generate product gases, the water storage tank needs replenishment from an external source (not shown). As shown in FIG. 1, the oxygen in the water storage tank 14 is vented, but may also be captured for use.

This lifting of entrained water is known as the gas lift principle. The gas-lift principle employed for transporting fluid is compatible with electrolysis cell stacks in either horizontal (see FIG. 1) or vertical orientation with reference to the cell membrane or cell electrode structures, as well as with operation at elevated ambient pressure levels provided the phase separators and water storage tanks are sized accordingly.

Also during operation of the system 10, hydrogen protons at the anode of the cell stack 12 migrate across the cell membrane (not shown) to the cathode. The migrating protons move or "pump" water with them by means of proton drag. A two phase stream including hydrogen and protonically pumped water present at the cathode leave the outlet 44 of the cathode and enter the second phase separator 38 at its inlet 40 wherein the water separates from and is disposed below the product hydrogen. The hydrogen builds up in pressure within the second phase separator 38 and is thereby forced through the supply line 48 for further use or external processing (not shown). The protonically pumped or hydrogen water in the second phase separator 38 is forced by this build-up in hydrogen pressure from the second phase separator 38 to the water recovery tank 14 via the supply line 56. Before the hydrogen water reaches the water storage tank 14, it may undergo further processing (not shown) to remove any dissolved hydrogen gas therein.

The system 10 of FIG. 1 was, for example, operated with a cell stack 12 including four cells and having a 0.05 $ft^2$ active area for each of the anode and cathode forming the electrodes of the cell stack 12. The temperature is preferably monitored at points labelled "T" along the supply lines 20 and 26 adjacent to the first water storage tank 14 and the first phase separator 28, as well as at a point adjacent to the cell stack 12 to prevent overheating. The 0.05 $ft^2$ active area is the same size as typically used in commercial, lab size hydrogen generators. For a current density of 1000 ASF, the hydrogen pressure is 100 psi, the oxygen pressure is ambient, and the cell stack operates at a temperature of about 70° F. to about 120° F.

The system 10 of FIG. 1 embodying the present invention thus provides recirculation of water reactant through the cell stack 12 without any additional mechanical pumps or components. The system when electrically powered employs the gas lift principle to, in effect, serve as a pump for circulating the water through the cell stack 12. Thus, an advantage of the present invention is that additional mechanical parts for pumping the water are eliminated. Another advantage is that the water circulation is external to the cell stack 12 and does not rely on the cell internal configuration for its proper operation. As such, the system 10 embodying the present invention may be adapted to any size cell stack and can be optimized for almost any range of current densities.

Figure 2:
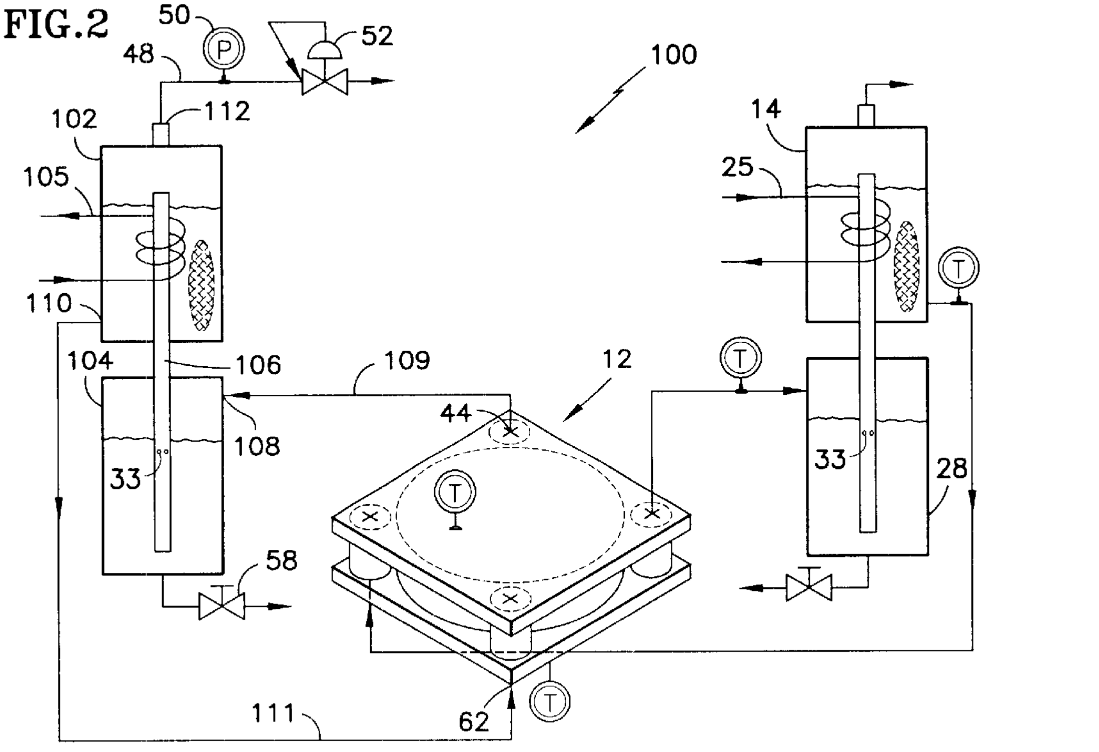
FIG. 2 is a schematic illustration of a second embodiment of a water electrolysis system in accordance with the present invention.

Turning now to FIG. 2, a water electrolysis system in accordance with a second embodiment of the present invention is generally designated by the reference number 100. The system 100 is similar to the system 10 of FIG. 1 except an additional water circulation loop is established through the cathode side of the cell stack 12. As shown in FIG. 2, an additional or second water storage tank 102 is disposed above the cell stack 12 and above a second phase separator 104. Means for cooling the water in the second water storage tank 102 may be necessary when the cell stack 12 is operating at high power levels. The means for cooling may be accomplished, for example, by a coil 105 disposed in the second tank 102 circulating cool water therethrough in order to cool the surrounding water in the tank. The second water storage tank 102 and the second phase separator 104 are in fluid communication by means of a second conduit 106 in the same way as described in the previous embodiment with respect to the first water storage tank 14 and the first phase separator 28.

The second phase separator 104 has an inlet 108 adjacent to an upper end thereof for receiving via a supply line 109 the two phase stream of protonically pumped water and product hydrogen leaving the outlet 44 of the cathode of the cell stack 12. The second water storage tank 102 includes an outlet 110 adjacent to a lower end thereof for gravity feeding water held in the second tank 102 via a supply line 111 to the inlet 62 of the cathode of the cell stack 12. The second water storage tank 102 further includes a gas outlet 112 for directing hydrogen away from the second tank 102 via supply line 48.

The operation of the system 100 on the anode side of the cell stack 12 is the same as previously described in the embodiment of FIG. 1, and therefore will not be repeated. The operation on the cathode side of the cell stack 12 (cathode feed mode) will now be explained. Water held in the second water storage tank 102 leaves the outlet 110 and is gravity fed via the supply line 111 to the inlet 62 of the cathode of the cell stack 12. When the system 100 is electrically powered, product hydrogen is produced in the cell stack 12 as water flows through the cathode side of the stack. A two-phase stream of unused water and product hydrogen leaves the outlet 44 of the cathode of the cell stack 12 and enters the inlet 108 of the second phase separator 104 via the supply line 109. Through the principle of gas lift, hydrogen enters within the second conduit 106 via openings 33 defined on the conduit and forms bubbles within the second conduit 106 and entrains and lifts water through the second conduit and into the second water storage tank 102. The recovered water in the second water storage tank 102 again separates and is disposed below the hydrogen in the second water storage tank. This water in the second water storage tank 102 is in position to be recirculated through the cell stack 12. The hydrogen in the second water storage tank 102 is forced by pressure build up within the tank 102 through the gas outlet 112 of the second tank 102 and along the supply line 48 for processing or other use.

As shown in FIGS. 1 and 2, the water electrolysis cell stack 12 may be operated in anode feed mode (FIG. 1), anode and cathode feed mode (FIG. 2) or cathode feed mode by shutting down the water circulation on the anode side of the cell stack of the system 100 shown in FIG. 2. Preferably, the electrolysis system operates in anode feed mode, or in both anode and cathode feed mode where the system is operating at high current densities. As mentioned, cathode feed electrolysis is possible, but at the expense of electrical performance and maximum current density capability.

Figure 3:
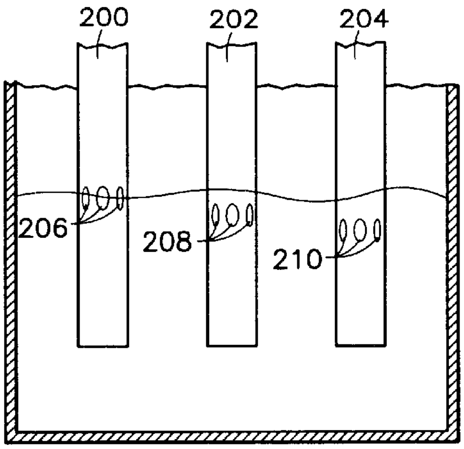
FIG. 3 schematically illustrates multiple perforated conduits connecting a phase separator and water tank.

Referring now to FIG. 3, a plurality of conduits may be employed for communicating between a phase separator and a water storage tank. For example, three conduits 200, 202 and 204 define openings 206, 208 and 210, respectively, for receiving product gas therein. As shown in FIG. 3, each of the conduits 200, 202 and 204 define openings at different levels relative to each other such that at a low power level of cell stack operation, only the conduit 200 provides gas lift, at mid power level of cell stack operation the conduits 200 and 202 provide gas lift, and at high power levels all three of the conduits 200, 202 and 204 provide gas lift.

More specifically, when a relatively low level of electrical power is applied to the cell stack 12, the pressure of the product gas in the phase separator bears downwardly against the water such that the water level lowers slightly to partly expose the openings 206 of the conduit 200, as shown in FIG. 3. The exposed openings 206 permit product gas to enter within the conduit 200 and therein entrain and lift water therethrough and into the water storage tank. As can be seen in FIG. 3, the openings 208 of the conduit 202 and the openings 210 of the conduit 204 are below water level and consequently do not permit the product gas to enter and entrain water upwardly through these conduits.

As power levels applied to the cell stack 12 are progressively increased, the flow of water through the cell stack 12 increases, and in turn the product gas pressure within the phase separator increases. This progressively increasing pressure bearing against the water in the phase separator causes the water level to progressively decrease such that the openings 208 of the conduit 202 are eventually exposed in addition to the exposed openings 206 of the conduit 200. Thus, the two conduits 200 and 202 are employed for gas lift when a larger amount of water flow needs to be accommodated. As the power applied to the cell stack 12 continues to increase, the water level will continue to decrease until the openings 210 of the conduit 204 are also exposed. Thus, at yet higher levels of power, the three conduits 200, 202 and 204 are all employed for gas lift when even larger amounts of water flow need to be accommodated.

Figure 4:
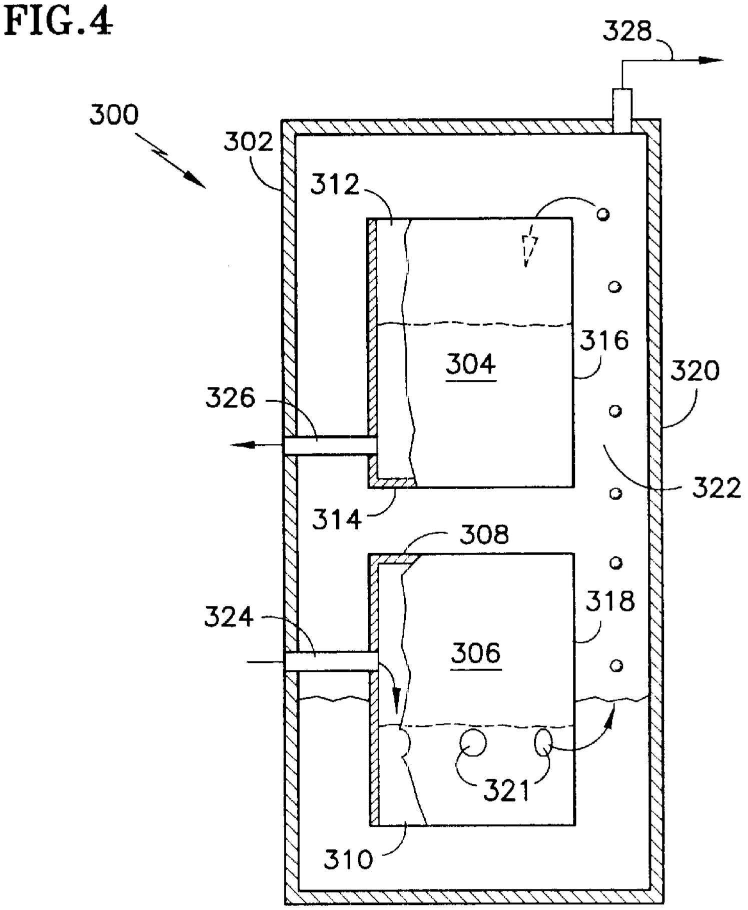
FIG. 4 schematically illustrates another embodiment of a phase separator and water tank unit.

FIG. 4 illustrates a phase separator and water tank unit 300 which may be substituted for the phase separators and water storage tanks shown in the previous figures. The unit 300 includes a housing 302 for accommodating a water storage tank 304 to be disposed above a cell stack (not shown) and a phase separator chamber 306 disposed below the tank. As shown in FIG. 4, the chamber 306 has a closed upper end 308 and an open lower end 310, and the water storage tank 304 has an open upper end 312 and a closed lower end 314. The water storage tank 304 and the phase separator chamber 306 have respective sidewalls 316 and 318 each spaced inwardly of a sidewall 320 of the unit housing 302. As shown in FIG. 4, the sidewall 318 of the phase separator chamber 306 defines a plurality of openings 321, 321 about the chamber. The sidewalls 316, 318 and 320 cooperate to define a passage 322 extending generally about the sidewalls 316, 318 of the water storage tank 304 and the phase separator chamber 306. The passage 322 also extends from the open lower end 310 of the phase separator chamber 306 to the open upper end 312 of the water storage tank 304.

A first conduit or inlet port 324 extending across a portion of the passage 322 from the sidewall 320 of the unit housing 302 to the sidewall 318 of the phase separator chamber 306 permits a two phase stream of water and product gas leaving the cell stack to enter the chamber. A second conduit or outlet port 326 extending across a portion of the passage 322 from the sidewall 320 of the unit housing 302 to the sidewall 316 of the water storage tank 304 permits water in the tank be gravity fed from the tank to the cell stack.

During cell stack operation, a two phase stream of water and product gas exits the cell stack and enters an interior of the phase separator chamber 306 via the inlet port 324. Within the phase separator chamber 306 water and product gas separate from one another such that product gas is disposed in the chamber above the water. Some of the water enters the passage 322 via the open lower end 310 of the chamber 306 and rises in the passage until an equilibrium level is established along the sidewall 318 of the chamber. As the two phase stream continues to enter the chamber 306 the product gas rises in pressure and some of the gas is forced out of the chamber 306 into the passage 322 via the openings 321 defined in the sidewall 318 of the chamber. The product gas entering the passage 322 rises and entrains water in the passage. This process of water entrained on and rising with gas is known as the gas lift principle. The entrained water rises along with the product gas within the passage 322 to a level that is above the open upper end 312 of the water storage tank 304, and thereafter separates from the product gas and enters the water storage tank. The product gas leaves the unit 300 through line 328. The recovered water in the water storage tank 304 is available to leave the tank via the outlet port 326 for recycling through the cell stack by means of gravity feeding. An advantage of the structural configuration of the unit 300 is that the sidewall 320 of the unit 300 enclosing and adjacent to the entrained water provides a large surface area for the efficient cooling of the entrained water by means of ambient air disposed on the outer side of the sidewall 320. Thus, the large surface area facilitates the elimination of additional means, such as cooling coils, for cooling the water.

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention. For example, the conduits for transporting entrained water in the phase separator may be in various forms such as a truncated cone with vertically arranged openings. Accordingly, the present invention has been shown and described by way of illustration rather than limitation.

What is claimed is:

1. A water electrolysis system comprising:

a water electrolysis cell stack having an anode and a cathode;

a water storage tank having an outlet disposed above the cell stack and communicating with an inlet of one of the anode and the cathode of the cell stack for gravity feeding water from the water storage tank to the cell stack; and a phase separator having a housing disposed below and in communication with the water storage tank, the phase separator having an inlet for receiving a two phase stream including water and product gas exiting an outlet of the one of the anode and cathode of the cell stack, and including a conduit having a lower end disposed within the housing for receiving water recovered in the phase separator, and the conduit having an upper end extending into the water storage tank, the conduit defining a plurality of openings along a portion of the conduit disposed in the phase separator such that the conduit is adapted to receive product gas from the phase separator through the plurality of openings, whereby the product gas thereupon rises upwardly with entrained water therewith through the conduit such that the entrained water enters the water storage tank and is available to be gravity fed to and recirculated through the cell stack.

2. A water electrolysis system as defined in claim 1, wherein the outlet of the water storage tank communicates with the inlet of the anode of the cell stack, the inlet of the phase separator communicates with the outlet of the anode of the cell stack, and the product gas is oxygen.

3. A water electrolysis system as defined in claim 2, further including an additional phase separator, the additional phase separator having an inlet communicating with an outlet of the cathode of the cell stack for receiving a two-phase stream including hydrogen and water, and having an outlet communicating with the water storage tank for delivering water from the additional phase separator to the water storage tank.

4. A water electrolysis system as defined in claim 3, wherein the outlet of the additional phase separator further communicates with an inlet of the cathode of the cell stack to divert a portion of the water from the additional phase separator to cool the cell stack.

5. A water electrolysis system as defined in claim 1, wherein the outlet of the water storage tank communicates with the inlet of the cathode of the cell stack, the inlet of the phase separator communicates with the outlet of the cathode of the cell stack, and the product gas is hydrogen.

6. A water electrolysis system as defined in claim 1, further comprising:

an additional water storage tank having an outlet disposed above the cell stack and communicating with an inlet of the other one of the anode and the cathode of the cell stack for gravity feeding water from the additional water storage tank to the cell stack; and an additional phase separator having a housing disposed below and in communication with the additional water storage tank, the additional phase separator having an inlet for receiving a two phase stream including water and product gas exiting an outlet of the other one of the anode and cathode of the cell stack, and including an additional conduit having a lower end disposed within the additional phase separator for receiving water recovered in the additional phase separator, and the additional conduit having an upper end extending into the additional water storage tank, the additional conduit defining an additional plurality of openings along a portion of the additional conduit disposed in the additional phase separator such that the additional conduit is adapted to receive product gas from the additional phase separator through the additional plurality of openings, whereby the product gas thereupon rises upwardly with entrained water therewith through the additional conduit such that the entrained water enters the additional water storage tank and is available to be gravity fed to and recirculated through the cell stack.

7. A water electrolysis system as defined in claim 1, further including means for cooling the water in the water storage tank.

8. A water electrolysis system as defined in claim 7, wherein the cooling means is a coil disposed within the water storage tank, the coil for carrying cool water therethrough to provide cooling to the surrounding water in the storage tank.

9. A water electrolysis system as defined in claim 1, further including additional conduits communicating between the phase separator and the water storage tank, each of the conduits defining openings at different levels within the phase separator relative to each other.

10. A water electrolysis system comprising:

a water electrolysis cell stack having an anode and a cathode; and a water storage and phase separator unit including:

a housing having a sidewall;

a water storage tank disposed above the cell stack, and having an open upper end, a sidewall and a closed lower end, the tank including an outlet port extending from the sidewall of the housing to the sidewall of the tank for supplying gravity fed water to one of the anode and the cathode of the cell stack; and a phase separator chamber disposed below the tank, and having a closed upper end, a sidewall defining a plurality of openings and an open lower end, the chamber including an inlet port extending from the sidewall of the housing to the sidewall of the chamber for receiving into the chamber a two phase stream of water and product gas from the other of the anode and the cathode of the cell stack, the sidewalls of the tank, chamber and housing cooperating to define a passage extending generally about the tank and chamber from the lower open end of the chamber to the open upper end of the tank, whereby the product gas in the phase separator chamber is forced by pressure outwardly into the passage and thereupon rises upwardly with entrained water such that the entrained water enters the tank and is available to be gravity fed to and recirculated through the cell stack.

11. A water electrolysis system as defined in claim 10, wherein the outlet port of the water storage tank communicates with the inlet of the anode of the cell stack, the inlet port of the phase separator chamber communicates with the outlet of the anode of the cell stack, and the product gas is oxygen.

12. A water electrolysis system as defined in claim 10, wherein the outlet port of the water storage tank communicates with the inlet of the cathode of the cell stack, the inlet port of the phase separator chamber communicates with the outlet of the cathode of the cell stack, and the product gas is hydrogen.

* * * * *